(12) United States Patent
Takara (10) Patent No.: US 11,100,363 B2
(45) Date of Patent: Aug. 24, 2021

(54) CHARACTER RECOGNITION PROGRAM AND METHOD

(71) Applicant: TOSHIBA TEC KABUSHIKI KAISHA, Tokyo (JP)

(72) Inventor: Syusaku Takara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/576,686

(22) Filed: Sep. 19, 2019

(65) Prior Publication Data

US 2020/0311471 A1 Oct. 1, 2020

(30) Foreign Application Priority Data

Mar. 25, 2019 (JP) .............................. JP2019-057218

(51) Int. Cl.
*G06K 9/62* (2006.01)
*G06K 9/00* (2006.01)
*G06K 9/80* (2006.01)

(52) U.S. Cl.
CPC ....... *G06K 9/6217* (2013.01); *G06K 9/00402* (2013.01); *G06K 9/80* (2013.01); *G06K 2209/01* (2013.01)

(58) Field of Classification Search
CPC .... G06K 9/6217; G06K 9/00402; G06K 9/80; G06K 2209/01; G06K 9/00993; G06K 9/6201
See application file for complete search history.

(56) References Cited

U.S. PATENT DOCUMENTS

| 5,805,747 | A  | * | 9/1998 | Bradford | ............... | G06K 9/03 |
| 6,671,404 | B1 | * | 12/2003 | Kawatani et al. | ....... | G06K 9/66 |
| 7,162,086 | B2 | * | 1/2007 | Ikeda | .................... | G06K 9/18 |
| 8,238,664 | B2 |   | 8/2012 | Kanematsu | | |
| 2008/0239330 | A1 |   | 10/2008 | Sato | | |
| 2011/0142344 | A1 | * | 6/2011 | Fukushima | ........ | G06K 9/00979 |
| | | | | | | 382/182 |

FOREIGN PATENT DOCUMENTS

JP 2007-086954 A 4/2007

OTHER PUBLICATIONS

Extended European Search Report issued in EP Application No. 19209977.8 dated Sep. 22, 2020, 9 pages.

* cited by examiner

*Primary Examiner* — Siamak Harandi
(74) *Attorney, Agent, or Firm* — Foley & Lardner LLP (57) ABSTRACT

A method disclosed herein uses a processor of a server to function as a processing unit to enhance accuracy of character recognition in a terminal connected to the server, using a communication apparatus of the server. The processing unit may be configured to acquire first data indicating a result of character recognition with respect to image data taken by the terminal. The processing unit can determine a character type of a character included in the image data when it is determined that misrecognition is included in the result of character recognition based on the first data. The processing unit controls the communication apparatus to transmit second data according to the character type to terminal and instructs the terminal to perform character recognition using the second data with respect to the image data in order to improve the accuracy of character recognition.

20 Claims, 5 Drawing Sheets

CHARACTER RECOGNITION PROGRAM AND METHOD

CROSS-REFERENCE TO RELATED APPLICATION

This application claims the benefit and priority from Japanese Patent Application No. 2019-057218, filed on Mar. 25, 2019, the entire contents of which are incorporated herein by reference.

FIELD

Embodiments described herein relate generally to a program and a character recognition method.

BACKGROUND

The accuracy of optical character recognition (OCR) needs improvement. Hereinafter, OCR or the like will be referred to as "character recognition."

DESCRIPTION OF THE DRAWINGS

FIG. 2 is a flowchart illustrating an example of a process by a processor of a terminal device of FIG. 1;

DETAILED DESCRIPTION

Embodiments herein provide a character recognition program and related methods for improving the accuracy of character recognition.

According to one embodiment, a method causes a processor provided in a first apparatus including a communication apparatus to function as a processing unit. The processing unit acquires first data indicating a result of performing character recognition with respect to image data by a second apparatus. The processing unit determines a character type of a character included in the image data when it is determined that misrecognition is included in the result of character recognition based on the first data. The processing unit controls the communication apparatus to transmit second data according to the character type to the second apparatus in order to improve the accuracy of character recognition, and instructs the second apparatus to perform character recognition using the second data with respect to the image data.

Hereinafter, a character recognition system according to an embodiment will be described with reference to the drawings. In addition, components may be omitted in each drawing used to describe the following embodiments for the sake of explanation. In addition, the same reference numerals denote the same elements in the drawings and the following description.

Figure 1:
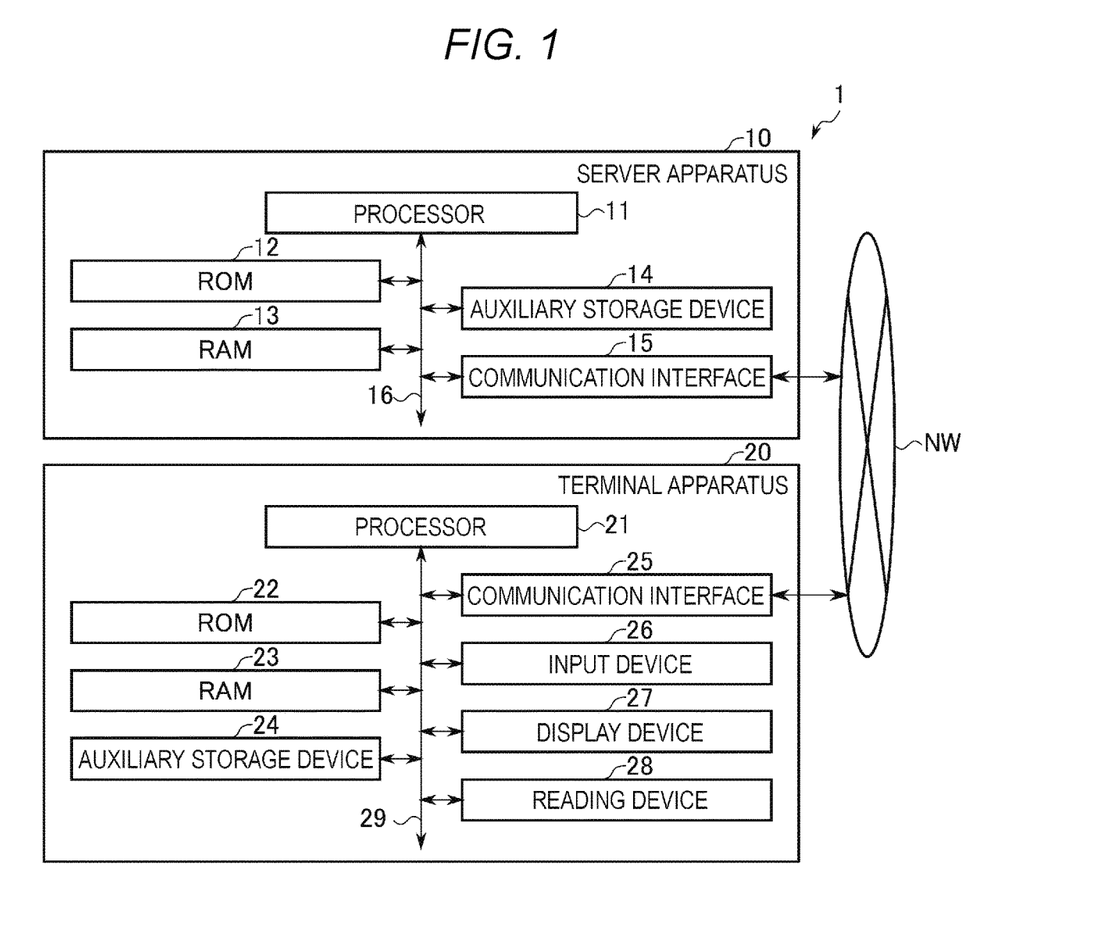
FIG. 1 is a block diagram showing a character recognition system according to an embodiment and an example of a main circuit configuration of components included in the character recognition system.

FIG. 1 is a block diagram showing a character recognition system 1 according to an embodiment and an example of a main circuit configuration of components included in the character recognition system 1. The character recognition system 1, as an example, includes a server apparatus 10 and a terminal apparatus 20. In addition, FIG. 1 shows one server apparatus 10 and one terminal apparatus 20. However, the number of server apparatuses 10 and the number of terminal devices 20 are not limited thereto. The following description describes an example of a case where one server apparatus 10 and one terminal apparatus 20 are provided.

The server apparatus 10 and the terminal apparatus 20 are connected to a network NW. The network NW is typically a communication network which includes a private network such as Intranet. The network NW is typically a communication network including a local area network (LAN). The network NW may be a communication network including the Internet. The network NW may be a communication network including a wide area network (WAN). In addition, the network NW may be a wireless line, a wired line or a combination of a wireless line and a wired line. In addition, the network NW may be a communication network including a dedicated line or a public mobile telephone network.

The server apparatus 10 is an apparatus capable of performing character recognition with higher accuracy than the terminal apparatus 20. The server apparatus 10 includes, for example, a processor 11, a read-only memory (ROM) 12, a random-access memory (RAM) 13, an auxiliary storage device 14 and a communication interface 15. Such parts are connected through a bus 16 or the like. The server apparatus 10 is an example of a first apparatus.

The processor 11 corresponds to a central part of a computer for performing a process such as calculation and control necessary for the operation of the server apparatus 10. The processor 11 controls each part to realize various functions of the server apparatus 10 based on programs such as firmware, system software and application software stored in the ROM 12, the auxiliary storage device 14, or the like. In addition, some or all of the programs may be embedded in the circuit of the processor 11. The processor 11 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD) or a field-programmable gate array (FPGA), and the like. Alternatively, the processor 11 may be a combination of several of the above. The processor 11 functions as an example of a processing unit by executing the above-described programs.

The ROM 12 corresponds to a main storage device of a computer centered on the processor 11. The ROM 12 is a non-volatile memory used to read exclusive data. The ROM 12 stores, for example, firmware among the above-described programs. In addition, the ROM 12 stores various types of setting values or data used for the processor 11 to perform various processes.

The RAM 13 corresponds to a main storage device of the computer centered on the processor 11. The RAM 13 is a memory used to read and write data. The RAM 13 temporarily stores data used for the processor 11 to perform various processes and is used as a work area. The RAM 13 is, for example, a volatile memory.

The auxiliary storage device 14 corresponds to an auxiliary storage device of a computer centered on the processor 11. The auxiliary storage device 14 is, for example, an electric erasable programmable read-only memory (EEPROM), a hard disk drive (HDD), a solid state device (SSD), an embedded MultiMediaCard (eMMC), or the like. The auxiliary storage device 14 stores, for example, system software, application software, and the like among the above-described programs. In addition, the auxiliary storage device 14 stores data used for the processor 11 to perform various processes, data generated by the process performed by the processor 11, various setting values, and the like.

The program stored in the ROM 12 or the auxiliary storage device 14 includes a program for executing the below-described process. For example, the server apparatus 10 is transferred to the administrator of the server apparatus 10 in a state where the program is stored in the ROM 12 or the auxiliary storage device 14. However, the server apparatus 10 may be transferred to the administrator in a state where the program is not stored in the ROM 12 or the auxiliary storage device 14. In addition, the server apparatus 10 may be transferred to the administrator in a state where a program different from the program is stored in the ROM 12 or the auxiliary storage device 14. The program for executing the below-described process may be separately transferred to the administrator and written in the ROM 12 or the auxiliary storage device 14 under operation by the administrator or a serviceman. Transfer of the program at this time can be realized, for example, by recording in a removable storage medium such as a magnetic disk, a magneto-optical disk, an optical disc or a semiconductor memory or downloading through the network NW, etc.

The communication interface 15 is an interface for performing communication of the server apparatus 10 through the network NW. The communication interface 15 is an example of a communication apparatus.

The bus 16 includes a control bus, an address bus, a data bus, and the like and transmits signals transmitted and received by the parts of the server apparatus 10.

The terminal apparatus 20 is, for example, a personal computer (PC), a tablet PC, a smartphone, a server apparatus or an image forming apparatus such as a multifunction peripheral (MFP) or a copy machine. The terminal apparatus 20 includes, for example, a processor 21, a ROM 22, a RAM 23, an auxiliary storage device 24, a communication interface 25, an input device 26, a display device 27 and a reading device 28. A bus 29 or the like connects such parts. The terminal apparatus 20 is an example of a second apparatus.

The processor 21 corresponds to the central part of a computer for performing a process such as calculation and control necessary for the operation of the terminal apparatus 20. The processor 21 controls each part to realize various functions of the terminal apparatus 20 based on programs such as firmware, system software and application software stored in the ROM 22, the auxiliary storage device 24, or the like. In addition, some or all of the programs may be embedded in the circuit of the processor 21. The processor 21 is, for example, a CPU, an MPU, an SoC, a DSP, a GPU, an ASIC, a PLD, or an FPGA, or the like. Alternatively, the processor 21 may be a combination of several of the above.

The ROM 22 corresponds to a main storage device of a computer centered on the processor 21. The ROM 22 is a non-volatile memory used to read exclusive data. The ROM 22 stores, for example, firmware among the above-described programs. In addition, the ROM 22 stores various types of setting values or data used for the processor 21 to perform various processes.

The RAM 23 corresponds to a main storage device of the computer centered on the processor 21. The RAM 23 is a memory used to read and write data. The RAM 23 temporarily stores data used for the processor 21 to perform various processes and is used as a work area. The RAM 23 is, for example, a volatile memory.

The auxiliary storage device 24 corresponds to an auxiliary storage device of a computer centered on the processor 21. The auxiliary storage device 24 is, for example, an EEPROM, an HDD, an SSD, an eMMC, or the like. The auxiliary storage device 24 stores, for example, system software, application software, and the like among the above-described programs. In addition, the auxiliary storage device 24 stores, for example, character recognition software as application software. The character recognition software has a character recognition function. In addition, the character recognition software includes a plurality of character recognition engines. The plurality of character recognition engines include a character recognition engine specialized in character recognition of a specific character type.

In addition, the auxiliary storage device 24 stores data used for the processor 21 to perform various processes, data generated by the process performed by the processor 21, various setting values, and the like.

The terminal apparatus 20 may include an interface, into which a storage medium such as a memory card or a universal serial bus (USB) can be inserted, as the auxiliary storage device 24. The interface reads and writes information from and in the storage medium.

The program stored in the ROM 22 or the auxiliary storage device 24 includes a program for executing the below-described process. For example, the terminal apparatus 20 is transferred to the administrator of the terminal apparatus 20 in a state where the program is stored in the ROM 22 or the auxiliary storage device 24. However, the terminal apparatus 20 may be transferred to the administrator in a state where the program is not stored in the ROM 22 or the auxiliary storage device 24. In addition, the terminal apparatus 20 may be transferred to the administrator in a state where a program different from the program is stored in the ROM 22 or the auxiliary storage device 24. The program for executing the below-described process may be separately transferred to the administrator and written in the ROM 22 or the auxiliary storage device 24 under operation by the administrator or a serviceman. Transfer of the program at this time can be realized, for example, by recording in a removable storage medium such as a magnetic disk, a magneto-optical disk, an optical disc or a semiconductor memory or downloading through the network NW, or the like.

The communication interface 25 is an interface for performing communication of the terminal apparatus 20 through the network NW.

The input device 26 receives operations by the operator of the terminal apparatus 20. The input device 26 may be, for example, a keyboard, a keypad, a touchpad or a mouse.

The display device 27 displays a screen for notifying the operator of the terminal apparatus 20 of various types of information. The display device 27 may be, for example, a display such as a liquid crystal display or an organic electro-luminescence (EL) display. In addition, a touch panel may be used as the input device 26 and the display device 27. That is, a display panel included in a touch panel may be used as the display device 27 and a touchpad included in a touch panel may be used as the input device 26.

The reading device 28 captures an image. The reading device 28 is, for example, a scanner or a camera.

The bus 29 includes a control bus, an address bus, a data bus, and the like and transmits signals transmitted and received by each part of the terminal apparatus 20.

Figure 3:
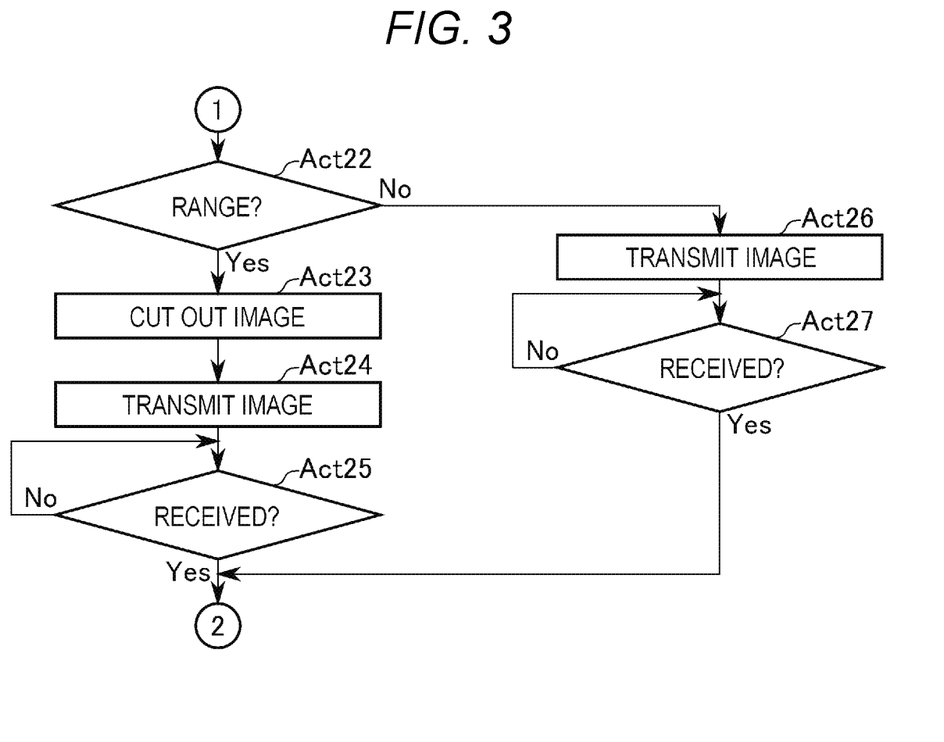
FIG. 3 is a flowchart illustrating an example of a process by a processor of the terminal device of FIG. 1.
Figure 4:
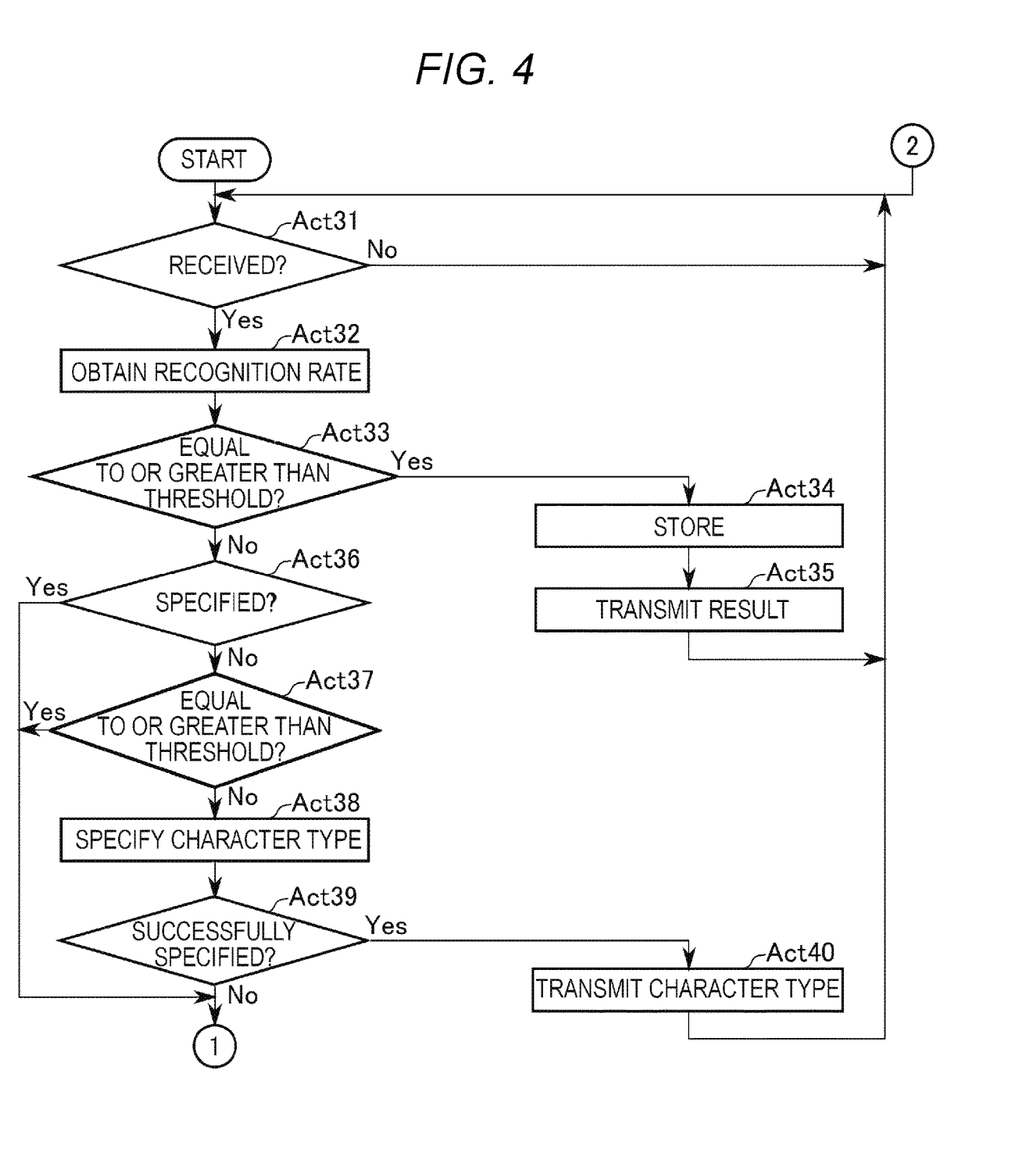
FIG. 4 is a flowchart illustrating an example of a process by a processor of a server apparatus of FIG. 1.
Figure 5:
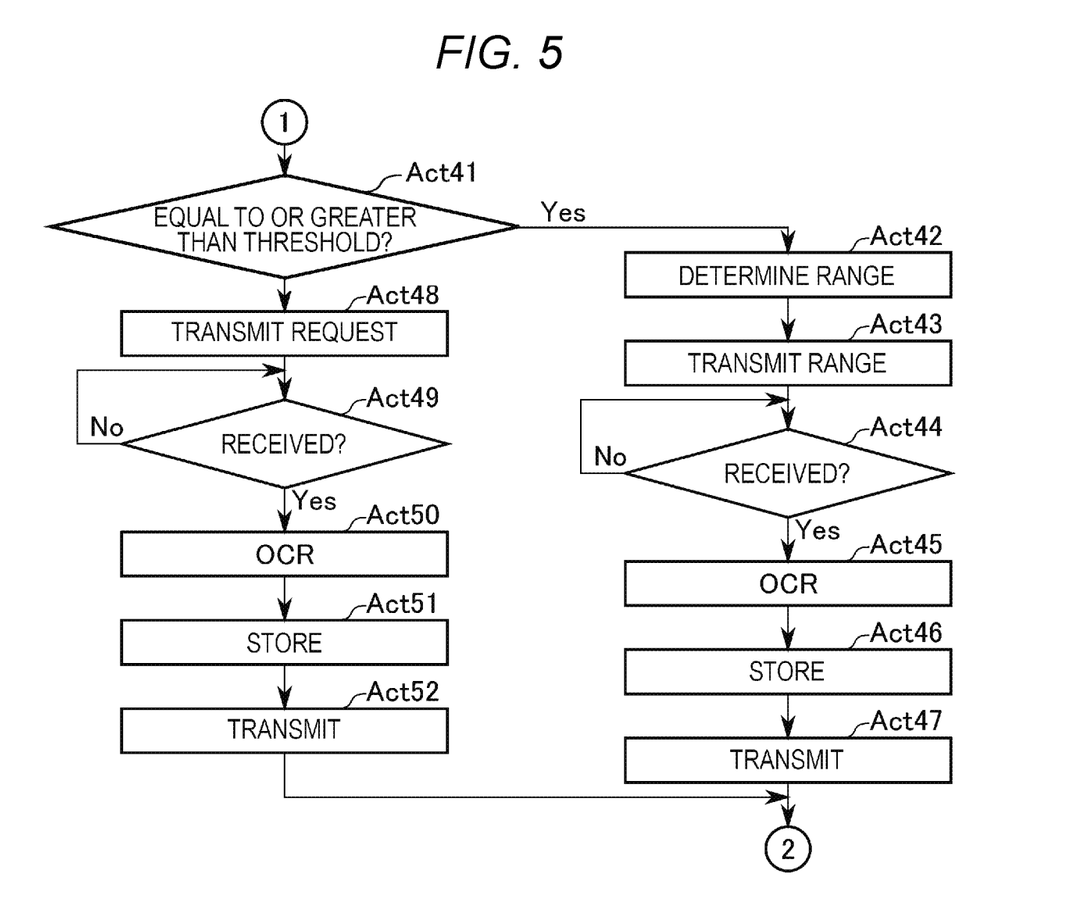
FIG. 5 is a flowchart illustrating an example of a process by a processor of the server apparatus of FIG. 1.

Hereinafter, operation of the character recognition system 1 according to the embodiment will be described with reference to FIGS. 2 to 5. In addition, the process contents of the description of the following operations are an example and various processes capable of obtaining the same result may be appropriately used. FIGS. 2 and 3 are flowcharts illustrating an example of a process by the processor 21 of the terminal apparatus 20. The processor 21 performs the process based on the programs stored in the ROM 22 or the auxiliary storage device 24, for example. The processor 21 starts the process illustrated in the flowcharts of FIGS. 2 and 3 by starting the character recognition software, for example. Alternatively, the processor 21 starts the process illustrated in the flowcharts of FIGS. 2 and 3 by turning on the terminal apparatus 20. FIGS. 4 and 5 are flowcharts illustrating an example of a process by the processor 11 of the server apparatus 10. The processor 11 performs the process based on the programs stored in the ROM 12 or the auxiliary storage device 14, for example. The processor 11 starts the process illustrated in the flowcharts of FIGS. 4 and 5 by turning on the server apparatus. In addition, when the processor 11 or the processor 21 proceeds to ACT (n+1) after the process of ACTn (n is a natural number), the description thereof may be omitted.

In Act11 of FIG. 2, the processor 21 of the terminal apparatus 20 waits for input of an image which is a target of character recognition. The image is an image read by the reading device 28, for example. Alternatively, the image is an image stored in the auxiliary storage device 24. In addition, the image may be an image including a plurality of images. When the image which is a target of character recognition is input, the processor 21 determines Yes in Act11 and proceeds to Act 12.

In Act12, the processor 21 waits for input of instructing the start of character recognition. The input is the operation input of instructing the terminal apparatus 20 to start character recognition with respect to the input device 26, for example. Alternatively, as the input, a command for instructing the terminal apparatus 20 to start character recognition may be received by the communication interface 25. When the input of instructing the start of character recognition is performed, the processor 21 determines Yes in Act12 and proceeds to Act13.

In Act13, the processor 21 performs character recognition with respect to the image (hereinafter referred to as a "target image") input in Act11 using the character recognition software.

In Act14, the processor 21 generates first result information. The first result information is data including the result of character recognition performed in Act13. The first result information includes characters read by character recognition from the target image and data indicating where each character is located in the target image. The processor 21 instructs the communication interface 25 to transmit the first result information to the server apparatus 10 after generating the first result information. The communication interface 25 which receives the instruction transmits the first result information to the server apparatus 10. The transmitted first result information is received by the communication interface 15 of the server apparatus 10. The first result information is an example of first data indicating the result of character recognition.

Meanwhile, in Act31 of FIG. 4, the processor 11 of the server apparatus 10 waits for reception of the result information by the communication interface 15. When the result information such as the first result information or second result information is received, the processor 11 determines Yes in Act31 and proceeds to Act32. In addition, the second result information will be described below.

In Act32, the processor 11 obtains a recognition rate of character recognition performed with respect to the target image in the terminal apparatus 20 from the result information received in Act31. For example, the processor 11 determines what character type or content has to be described in a specific range and obtains the recognition rate by a degree of matching of the result of character recognition with the character type or content.

The character type may be numbers, alphabets such as Latin characters, hiragana, katakana or Chinese characters, or a combination thereof. Alternatively, the character type may be a language such as English or Japanese. In addition, the character type may be a capital letter or a lowercase letter, a half-width character or a full-width character, and the like. In addition, the character type may be a font type. In addition, the character type may be a character color, a character size or a character direction. Alternatively, the character type may a combination of the above.

The processor 11 specifies, for example, the character type or content based on a nearby character string. For example, the processor 11 specifies that the character string on the right or below of the character string "account number" is numbers. Alternatively, the processor 11 specifies the character type or content using form data. The form data is data indicating where and what content or character string of character type is located in the image. For example, the form data specifies content and position thereof to have a title in a range AR11, a name in a range AR12, an identifier (ID) in a range AR13, an address in a range AR14, a free entry in a range AR15, and the like. Alternatively, the form data specifies the character type and the position thereof to have English in a range AR21, Japanese in a range AR22, a Latin character in a range AR23, a katakana in a range AR24, and the like.

Alternatively, the processor 11 may determine the character type or content and specify the position thereof using artificial intelligence (AI), and the like. For example, AI specifies the character type and the position thereof by pattern matching, or the like. AI learns pattern matching by machine learning such as deep learning.

In Act33, the processor 11 determines whether the recognition rate obtained in Act32 is equal to or greater than a threshold T1. When the recognition rate obtained in Act32 is equal to or greater than T1, the processor 11 determines Yes in Act33 and proceeds to Act34.

In Act34, the processor 11 stores the first result information or the result of character recognition included in the first result information in the auxiliary storage device 14 or the like.

In Act35, the processor 11 generates notification information. The notification information is data including information indicating that character recognition does not need to be performed again due to the high recognition rate. The processor 11 instructs the communication interface 15 to transmit the notification information to the terminal apparatus 20 as a transmission source of the result information, after generating the notification information. The communication interface 15 which receives the instruction transmits the notification information to the terminal apparatus 20. The transmitted notification information is received by the communication interface 25 of the terminal apparatus 20. The processor 11 returns to Act31 after the process of Act35.

Meanwhile, in Act15 of FIG. 2, the processor 21 of the terminal apparatus 20 waits for reception of data transmitted from the server apparatus 10 by the communication interface 25. When data such as notification information is received, the processor 21 determines Yes in Act15 and proceeds to Act16.

In Act16, the processor 21 determines whether character recognition of the target image ends to decide the result. The processor 21 determines that character recognition of the target image ends to decide the result, for example, according to the reception of the notification information. When the notification information is received, the processor 21 determines Yes in Act16 and proceeds to Act17.

In Act17, the processor 21 stores the result of character recognition in the auxiliary storage device 24 or the like. In addition, when the processor 21 proceeds from Act16 to Act17, the result of character recognition stored in Act17 is the result of character recognition of Act13.

In Act18, the processor 21 notifies the operator of the terminal apparatus 20 of the result of character recognition stored in Act13. The processor 21 displays the character string or image indicating the result on the display device 27 as a notification. Alternatively, the processor 21 outputs a sound indicating the result through a speaker as a notification. The processor 21 ends the display and returns to Act11 after the process of Act18.

Meanwhile, when the recognition rate obtained in Act32 of FIG. 4 is less than the threshold T1, the processor 11 of the server apparatus 10 determines No in Act33 and proceeds to Act36.

In Act36, the processor 11 determines whether the character type is specified. For example, when the result information received in Act31 is the first result information, the processor 11 determines that the character type is not specified. For example, when the result information received in Act31 is the second result information, the processor 11 determines that the character type is specified. When it is determined that the character type is not specified, the processor 11 determines No in Act36 and proceeds to Act37. In addition, specification of the character type will be described later.

In Act37, the processor 11 determines whether the recognition rate obtained in Act32 is equal to or greater than a threshold T2. When the recognition rate obtained in Act32 is not equal to or greater than the threshold T2, the processor 11 determines No in Act37 and proceeds to Act38. In addition, the threshold T2 is a value less than the threshold T1.

In Act38, the processor 11 specifies the character type of the character included in the target image using the first result information. The processor 11 specifies the character type and, at the same time, specifies the position of each character type in the target image. In addition, the position may be indicated by a point or a range. For example, the processor 11 specifies the character type and the position thereof to have numbers in a range AR31, Latin characters in a range AR32, a combination of hiragana, katakana and Chinese characters in a range AR33, Latin capital characters in a range AR34, and the like.

In addition, the processor 11 specifies, for example, the character type using the form data or AI.

In Act39, the processor 11 determines whether the character type is successfully specified by the process of Act38. When the character type is successfully specified, the processor 11 determines Yes in Act39 and proceeds to Act40. In addition, the character type being successfully specified does not necessarily mean that the character type is actually matched but it is sufficient that the processor 11 determines that the character type was able to be specified.

In Act40, the processor 11 generates character type information. The character type information is data for instructing the terminal apparatus 20 to perform character recognition using a method suitable for the character type (hereinafter referred to as a "specific character type") specified by the process of Act38. In addition, the character type information includes one or more pieces of instruction information. The character type information is data for instructing the terminal apparatus 20 to perform character recognition using the instruction information.

The instruction information is, for example, information including position information indicating the position on the target image and a parameter suitable for the specific character type of the position. The parameter is a setting value for changing the setting of the character recognition software to increase the recognition rate of the specific character type. Alternatively, the parameter is a setting value for specifying the use of a character recognition engine with a high recognition rate of the specific character type of the position. The instruction information is an example of second data according to the character type in order to improve the accuracy of character recognition. The parameter included in the instruction information is an example of second data.

The processor 11 instructs the communication interface 15 to transmit the character type information to the terminal apparatus 20 as a transmission source of the first result information after generating the character type information. The communication interface 15 which receives the instruction transmits the character type information to the terminal apparatus 20. The transmitted character type information is received by the communication interface 25 of the terminal apparatus 20.

Meanwhile, when the character type information is received by the communication interface 25, the processor 21 of the terminal apparatus 20 determines Yes in Act15 of FIG. 2 and proceeds to Act16. Then, the processor 21 determines No in Act16 and proceeds to Act19.

In Act19, the processor 21 determines whether character recognition is performed again. For example, when the character type information is received, the processor 21 determines that character recognition is performed again. When the character type information is received, the processor 21 determines Yes in Act19 and proceeds to Act20.

In Act20, the processor 21 performs character recognition with respect to the target image according to the instruction information included in the character type information. That is, the processor 21 changes setting of the character recognition software according to the parameter included in the instruction information. The character recognition is performed with respect to the position specified in the position information included in the instruction information of the target image by the character recognition software after setting change. The processor 21 performs character recognition with respect to each type of instruction information included in the character type information in the same manner.

In Act21, the processor 21 generates the second result information. The second result information is data including the result of character recognition performed in Act20. The second result information includes data indicating characters read from the target image by character recognition and the position of each character in the target image. The second result information includes data indicating that the character type is specified. The processor 21 instructs the communication interface 25 to transmit the result information to the server apparatus 10 after generating the result information. The communication interface which receives the instruction transmits the result information to the server apparatus 10. The transmitted result information is received by the communication interface 15 of the server apparatus 10. The processor 21 returns to Act15 after the process of Act21.

Meanwhile, when the character type is not successfully specified, the processor 11 of the server apparatus 10 determines No in Act39 of FIG. 4 and proceeds to Act41. In addition, when it is determined that the character type is specified by the reception of the second result information, the processor 11 determines Yes in Act36 and proceeds to Act41. In addition, when the recognition rate obtained in Act32 is equal to or greater than the threshold T2, the processor 11 determines Yes in Act37 and proceeds to Act41.

In Act41, the processor 11 determines whether the recognition rate obtained in Act32 is equal to or greater than a threshold T3. When the recognition rate obtained in Act32 is equal to or greater than the threshold T3, the processor 11 determines Yes in Act 41 and proceeds to Act42. In addition, the threshold T3 is a value lower than the threshold T2.

In Act42, the processor 11 determines a range where character recognition is inaccurate (hereinafter referred to as a "misrecognition range") from the result information received in Act31. In addition, the processor 11 determines a range in which the character type or content is different from an assumed character type or content as a misrecognition range.

In Act43, the processor 11 generates a range request. The range request is data for requesting the terminal apparatus 20 to transmit the image data including the misrecognition range. The range request includes data indicating the misrecognition range. The processor 11 instructs the communication interface 15 to transmit the range request to the terminal apparatus 20 after generating the range request. The communication interface 15 which receives the instruction transmits the range request to the terminal apparatus 20. The transmitted range request is received by the communication interface 25 of the terminal apparatus 20.

Meanwhile, when the range request is received by the communication interface 25, the processor 21 of the terminal apparatus 20 determines Yes in Act15 of FIG. 2 and proceeds to Act16. Then, the processor 21 determines No in Act16 and proceeds to Act19. Further, the processor 21 determines No in Act19 and proceeds to Act22.

In Act22, the processor 21 determines whether the received data is a range request. When the received data is a range request, the processor 21 determines Yes in Act22 and proceeds to Act23.

In Act23, the processor 21 cuts out a range including the misrecognition range from the target image. The cut-out range is, for example, a range in which the characters in the misrecognition range are appropriately included. In addition, the cut-out range is preferably narrow. It is because the amount of data of the cut-out image decreases as the cut-out range decreases. However, the cut-out range may be a wider range. The processor 21 stores the cut-out image (hereinafter referred to as a "cut-out image") in the RAM 13 or the auxiliary storage device 14. In addition, when the target image is composed of a plurality of images, the processor 21 may select an image including the misrecognition range from among the plurality of images and treat the image as the cut-out image in the same manner. The cut-out image is an example of a partial image.

In Act24, the processor 21 instructs the communication interface 25 to transmit the cut-out image to the server apparatus 10. The communication interface 25 which receives the instruction transmits the cut-out image to the server apparatus 10. The transmitted cut-out image is received by the communication interface 15 of the server apparatus 10.

Meanwhile, in Act44 of FIG. 4, the processor 11 of the server apparatus 10 waits for reception of the cut-out image by the communication interface 15. When the cut-out image is received, the processor 11 determines Yes in Act44 and proceeds to Act45.

In Act45, the processor 11 performs character recognition with respect to the cut-out image received in Act44.

In Act46, the processor 11 stores the result of character recognition of Act45 in the auxiliary storage device 14 or the like.

In Act47, the processor 11 generates first result notification. The first result notification is data including data indicating the result of character recognition of Act45. The processor 11 instructs the communication interface 15 to transmit the first result notification to the terminal apparatus after generating the first result notification. The communication interface 15 which receives the instruction transmits the first result notification to the terminal apparatus 20. The transmitted first result notification is received by the communication interface 25 of the terminal apparatus 20. The processor 11 returns to Act31 of FIG. 4 after the process of Act47.

Meanwhile, in Act25 of FIG. 3, the processor 21 of the terminal apparatus 20 waits for reception of the first result notification by the communication interface 25. When the first result notification is received, the processor 21 determines Yes in Act25 and proceeds to Act17 of FIG. 2.

When the processor 21 proceeds from Act25 to Act17, the result of character recognition stored in Act17 is obtained by applying the result of character recognition included in the first result notification to the result of character recognition of Act13. That is, the processor 21 employs the result of character recognition included in the first result notification with respect to character recognition of the same range between the result of character recognition of Act13 and the result of character recognition included in the first result notification. The processor 21 employs the result of character recognition of Act13 with respect to the other portion.

Meanwhile, when the recognition rate obtained in Act32 of FIG. 4 is not equal to or greater than the threshold T3, the processor 11 of the server apparatus 10 determines No in Act41 of FIG. 5 and proceeds to Act48.

In Act48, the processor 11 generates an image request. The image request is data for requesting the terminal apparatus 20 to transmit the image data of the target image. The processor 11 instructs the communication interface 15 to transmit the image request to the terminal apparatus 20 after generating the image request. The communication interface 15 which receives the instruction transmits the image request to the terminal apparatus 20. The transmitted image request is received by the communication interface 25 of the terminal apparatus 20.

Meanwhile, when the image request is received by the communication interface 25, the processor 21 of the terminal apparatus 20 determines Yes in Act15 of FIG. 2 and proceeds to Act16. The processor 21 determines No in Act16 and proceeds to Act19. The processor 21 determines No in Act19 and proceeds to Act22 of FIG. 3. Then, the processor 21 determines No in Act22 and proceeds to Act26.

In Act26, the processor 21 instructs the communication interface 25 to transmit the target image to the server apparatus 10. The communication interface 25 which receives the instruction transmits the target image to the server apparatus 10. The transmitted target image is received by the communication interface 15 of the server apparatus 10.

Meanwhile, in Act49 of FIG. 5, the processor 11 of the server apparatus 10 waits for reception of the target image by the communication interface 15. When the target image is received, the processor 11 determines Yes in Act49 and proceeds to Act50.

In Act50, the processor 11 performs character recognition with respect to the target image received in Act49.

In Act51, the processor 11 stores the result of character recognition of Act49 in the auxiliary storage device 14 or the like.

In Act53, the processor 11 generates second result notification. The second result notification is data including data indicating the result of character recognition of Act49. The processor 11 instructs the communication interface 15 to transmit the second result notification to the terminal apparatus after generating the second result notification. The communication interface 15 which receives the instruction transmits the second result notification to the terminal apparatus 20. The transmitted second result notification is received by the communication interface 25 of the terminal apparatus 20. The processor 11 returns to Act31 of FIG. 4 after the process of Act53.

Meanwhile, in Act27 of FIG. 3, the processor 21 of the terminal apparatus 20 waits for reception of the second result notification by the communication interface 25. When the second result notification is received, the processor 21 determines Yes in Act27 and proceeds to Act17 of FIG. 2.

When the processor 21 proceeds from Act27 to Act17, the result of character recognition stored in Act17 is the result of character recognition included in the second result notification.

As described above, the server apparatus 10 performs any one of the following (A) to (C) according to the recognition rate of character recognition performed by the terminal apparatus 20. When the recognition rate is less than the threshold T1 and is equal to or greater than threshold T2, the server apparatus 10 performs the process of (A). When the recognition rate is less than the threshold T2 and is equal to or greater than threshold T3, the server apparatus 10 performs the process of (B). When the recognition rate is less than the threshold T3, the server apparatus 10 performs the process of (C).

(A) The server apparatus 10 specifies the character type of the target image and the position thereof. The server apparatus 10 causes the terminal apparatus 20 to perform character recognition again using a method suitable for the character type.

(B) The server apparatus 10 determines a misrecognition range. The server apparatus 10 acquires an image including the misrecognition range of the target image from the terminal apparatus 20. In addition, the server apparatus 10 performs character recognition with respect to the acquired image.

(C) The server apparatus 10 acquires the target image from the terminal apparatus 20. The server apparatus 10 performs character recognition with respect to the acquired image.

As described above, for example, the process of (A) is the process according to the first method, and the process of (B) is the process according to the second method. Alternatively, the process of (A) is the process according to the first method, and the process of (C) is the process according to the second method. Alternatively, the process of (B) is the process according to the first method, and the process of (C) is the process according to the second method.

As described above, for example, the threshold T1 is a first threshold and the threshold T2 is a second threshold. Alternatively, the threshold T1 is a first threshold and the threshold T3 is a second threshold. Alternatively, the threshold T2 is a first threshold and the threshold T3 is a second threshold.

According to the character recognition system 1 of the embodiment, when the recognition rate of character recognition performed by the terminal apparatus 20 is less than the threshold T1, the server apparatus 10 performs the process of any one of (A) to (C).

Since the server apparatus 10 performs the process of any one of (A) to (C), it is possible to improve the recognition rate of character recognition as compared to the case where only the terminal apparatus 20 performs character recognition.

In addition, in the character recognition system 1 of the embodiment, the server apparatus 10 performs the process of (A) when the recognition rate is less than the threshold T1 and is equal to or greater than the threshold T2. The server apparatus 10 performs the process of (B) when the recognition rate is less than the threshold T2 and is equal to or greater than the threshold T3. The server apparatus 10 performs the process of (C) when the recognition rate is less than the threshold T3. As described above, the server apparatus 10 performs different processes according to the recognition rate. Therefore, the server apparatus 10 can perform the process suitable for the recognition rate.

In addition, in the character recognition system 1 of the embodiment, the server apparatus 10 has a smaller data volume of the image data acquired from the terminal apparatus 20 when the process of (B) is performed than the case where the process of (C) is performed. In the server apparatus 10 of the embodiment, since the process of (B) is performed, it is possible to reduce the data traffic as compared to the case of performing the process of (C).

In addition, according to the character recognition system 1 of the embodiment, in the server apparatus 10, the range of the image subjected to character recognition in the process of (B) is a portion of the image subjected to character recognition in the process of (C). Therefore, since the server apparatus 10 of the embodiment performs the process of (B), it is possible to reduce the processing load on character recognition as compared to the process of (C).

In addition, according to the character recognition system 1 of the embodiment, the server apparatus 10 stores the result of character recognition. Therefore, the server apparatus 10 can use the result of character recognition for various processes.

In addition, according to the character recognition system 1 of the embodiment, the terminal apparatus 20 stores the result of character recognition. Therefore, the terminal apparatus 20 can use the result of character recognition for various processes.

The above-described embodiments may be modified as follows.

In the above-described embodiment, the server apparatus 10 performs a process selected from three types of processes according to the recognition rate. However, the server apparatus 10 may perform a process selected from two or four or more types of processes according to the recognition rate. In addition, any two types of processes among a plurality of processes selected according to the recognition rate are examples of the first method and the second method.

The terminal apparatus 20 may transmit an address such as a URL indicating the cut-out image or the target image to the server apparatus 10 instead of transmitting the cut-out image or the target image to the server apparatus 10. In this case, the server apparatus 10 acquires the cut-out image or the target image from the address.

The processor 11 or the processor 21 may realize some or all of the processes realized by the programs in the above-described embodiments by the hardware configuration of a circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for using a processor in a first apparatus communicated to a second apparatus as a processing unit for increasing accuracy of character recognition in the second apparatus, the method comprising:
   receiving, in the first apparatus, a result of character recognition from the second apparatus;
   acquiring, from the second apparatus, first data indicating the result of character recognition with respect to image data measured by the second apparatus;
   determining, by the processor of the first apparatus and based on the first data, whether the result of character recognition from the second apparatus includes misrecognition; and
   upon a determination that the result includes misrecognition:
      determining, by the processor of the first apparatus, a character type of a character included in the image data;
      transmitting, from the first apparatus to the second apparatus, second data according to the character type; and
      instructing, by use of the second data, the second apparatus to perform another character recognition on the image data.

2. The method of claim 1, wherein transmitting, from the first apparatus to the second apparatus, the second data according to the character type is performed in a communication apparatus of the first apparatus.

3. The method of claim 1, wherein the first apparatus and the second apparatus are connected via a network, and the first apparatus is a server and the second apparatus is a terminal.

4. The method of claim 1, further comprising upon a determination that the result does not include misrecognition, transmitting to the second apparatus a notification information.

5. The method of claim 1, wherein the first data includes a recognition rate.

6. The method of claim 1, wherein the character type includes one of numbers, alphabets, Latin characters, hiragana, katakana, Chinese characters, or a combination thereof.

7. A method for causing a processor in a first apparatus including a communication apparatus to function as a processing unit for improving accuracy of character recognition in a second apparatus, the method comprising:
   acquiring first data indicating a result of character recognition with respect to image data in the second apparatus;
   determining, in the processor of the first apparatus, a range of misrecognition in the image data based on the first data;
   acquiring, in the second apparatus, partial image data corresponding to the range of misrecognition in the image data; and
   performing, in the second apparatus, another character recognition on the partial image data.

8. The method according to claim 7, further comprising:
   determining, in the processor of the first apparatus, a recognition rate of the character recognition based on the first data;
   acquiring, in the first apparatus and from the second apparatus, the image data when the recognition rate is equal to or less than a threshold; and
   performing, in the first apparatus, character recognition with regard to the image data.

9. The method according to claim 7, wherein the first apparatus is a server, the second apparatus is a terminal, and the server and the terminal are connected via a network.

10. A method for using a processor provided in a first apparatus to function as a processing unit, the method comprising:
    acquiring first data indicating a result of character recognition on image data taken by a second apparatus;
    determining a recognition rate of the character recognition based on the first data;
    performing character recognition with regard to the image data using a first method when the recognition rate is less than a first threshold and when the recognition rate is equal to or greater than a second threshold; and
    performing character recognition with regard to the image data using a second method when the recognition rate is less than the second threshold.

11. The method of claim 10, wherein performing character recognition with regard to the image data using the second method further comprises performing character recognition with regard to the image data using the second method when the recognition rate is less than the second threshold and is equal to or greater than the third threshold, and performing character recognition with regard to the image data using a third method when the recognition rate is less than the third threshold.

12. The method of claim 10, wherein performing character recognition to the image data using the first method comprises:
    specifying, by the processor of the first apparatus, a character type of the image data; and
    performing, in the first apparatus, character recognition based on the specified character type.

13. The method of claim 11, wherein performing character recognition using the second method when the recognition rate is less than the second threshold and is equal to or greater than the third threshold comprises:
    determining a misrecognition range of the image data;
    acquiring an image including the misrecognition range of the image data; and
    performing, in the first apparatus, character recognition to the acquired image.

14. The method of claim 13, wherein performing character recognition with regard to the image data using the third method when the recognition rate is less than the third threshold comprises:
    acquiring, in the first apparatus, the image data taken by the second apparatus;
    performing, in the first apparatus, character recognition on the image data.

15. The method of claim 10, wherein the first apparatus is a server, the second apparatus is a terminal, and the server and the terminal are connected via a network.

16. The method of claim 12, wherein the character type includes one of numbers, alphabets, Latin characters, hiragana, katakana, Chinese characters, or a combination thereof.

17. A character recognition method for causing a processor in a first apparatus to function as a processing unit for improving accuracy of character recognition in a second apparatus, the method comprising, comprising:
   in the second apparatus, performing character recognition with respect to image data and generating first data indicating a result of character recognition;
   in the first apparatus, determining whether misrecognition is included in the result of character recognition based on the first data and determining a character type of a character included in the image data when misrecognition is included in the result of character recognition; and
   in the second apparatus, performing character recognition using second data according to the character type in order to improve the accuracy of character recognition.

18. The character recognition method of claim 17, wherein the second apparatus is a terminal and the first apparatus is a server.

19. The character recognition method of claim 17, wherein the character type includes one of numbers, alphabets, Latin characters, hiragana, katakana, Chinese characters, or a combination thereof.

20. A character recognition method for causing a processor in a first apparatus to function as a processing unit for improving accuracy of character recognition in a second apparatus, the method comprising:
   performing, in the second apparatus, character recognition with respect to image data;
   generating, in the second apparatus, first data indicating a result of the character recognition;
   determining, in the first apparatus connected to the second apparatus, a misrecognition range of the image data based on the first data;
   acquiring, in the first apparatus from the second apparatus, partial image data corresponding to the misrecognition range; and
   performing, in the first apparatus, character recognition with respect to the partial image data.

* * * * *